United States Patent [19]

Suzuki et al.

[11] Patent Number: 4,675,799
[45] Date of Patent: Jun. 23, 1987

[54] CONTROL SYSTEM FOR POWER CONVERTER

[75] Inventors: Masato Suzuki; Hiroshi Narita; Shigetoshi Okamatsu; Kingo Abe, all of Katsuta, Japan

[73] Assignee: Hitachi, Ltd., Tokyo, Japan

[21] Appl. No.: 538,788

[22] Filed: Oct. 4, 1983

[30] Foreign Application Priority Data

Oct. 4, 1982 [JP] Japan ................ 57-175134

[51] Int. Cl.⁴ ............................................. H02H 7/122
[52] U.S. Cl. ......................................... 363/58; 363/96; 363/137
[58] Field of Search ............... 363/54, 57, 58, 96, 363/136, 137, 138; 318/801, 802, 806, 434

[56] References Cited

U.S. PATENT DOCUMENTS

| | | | |
|---|---|---|---|
| 3,760,258 | 9/1973 | Percorini et al. | 363/58 |
| 4,259,581 | 3/1981 | Csontos et al. | 363/58 |
| 4,376,296 | 3/1983 | Bhagwat et al. | 363/136 |
| 4,433,370 | 2/1984 | Karadsheh et al. | 363/57 |

FOREIGN PATENT DOCUMENTS

| | | | |
|---|---|---|---|
| 46-41250 | 1/1971 | Japan | 318/434 |
| 113833 | 9/1979 | Japan | 363/137 |
| 109170 | 8/1980 | Japan | 363/57 |
| 170075 | 10/1982 | Japan | 363/58 |
| 0600658 | 3/1978 | U.S.S.R. | 363/58 |

Primary Examiner—Peter S. Wong
Assistant Examiner—Judson H. Jones
Attorney, Agent, or Firm—Antonelli, Terry & Wands

[57] ABSTRACT

A power converter such as an inverter or chopper using self-turn-off type semiconductor devices supplies power to an inductive load and free wheel diodes are provided so that the current flowing through this load circulates not through the power supply but through the free wheel diodes. When it is detected that the load current exceeds a predetermined value, the self-turn-off-type semiconductors which are conductive are turned off. At this time, the self-turn-off-type semiconductors which are turned on and immediately thereafter cause the recovery current to flow in the free wheel diodes are turned off not immediately but after the recovery current disappears.

8 Claims, 8 Drawing Figures

CONTROL SYSTEM FOR POWER CONVERTER

This invention relates to the improvement of a control system for converter, and particularly to a control system for power transmission between an inductive load and a power converter using self-turn-off-type semiconductor devices which are semiconductor devices capable of turning themselves off by a gate signal or the like such as gate-turn-off thyristors and therefore do not require a reverse or backward voltage supply means for being turned off or static inductive thyristors.

Known power converters using self-turn-off-type thyristors (hereinafter, abbreviated GTO) include AC-DC converters, DC-AC converters (inverters), choppers and frequency converters.

These GTO power converters often supply power to inductive loads. In this case, it is necessary to provide a free wheel circuit by which the load current caused by the on-operation of the GTO is continuously flowed even when the GTO is turned off.

By the way, when the load current is excessively increased by a cause such as supply voltage variation, it is necessary to disconnect this current flowing circuit in order to protect the load and GTO. Thus, it is proposed that when the overcurrent in the load is detected, the normal on-off gate signals to all GTO's are cut off and a high-speed breaker is operated to disconnect the power supply from the converter. In this method, however, since it generally takes ten and several m sec for the high-speed breaker to completely break the circuit, the overload current flows in a particular GTO during the transient time. To decrease the load of the overcurrent, it is proposed to supply on-gate signals to all GTO's. Also in this method, however, since an excessive current is flowed from the power supply until the high-speed breaker operates to completely disconnect, the power supply becomes in overload condition, and finally the power supply itself is tripped. In addition, during the overload time, GTO's are often broken down.

Accordingly, it is an object of the invention to provide a control system for a power converter using self-turn-off-type semiconductor devices by which the overcurrent in the load can rapidly be cut off.

According to one aspect of this invention, there is provided a control system for a power converter having a power converter with self-turn-off-type semiconductor devices and an inductive load between which power transmission is made, and having free wheel circuits for the load current, wherein when it is detected that the load current exceeds a predetermined value, at least the self-turn-off-type semiconductor devices under conduction are supplied with off-gate signals.

In a preferred embodiment of the invention, the self-turn-off-type semiconductor devices which are conductive and cause no recovery current to flow in the free wheel circuits, are supplied with off-gate signals.

The present invention will be apparent from the following detailed description taken in conjunction with the accompanying drawings, in which.

Figure 4:
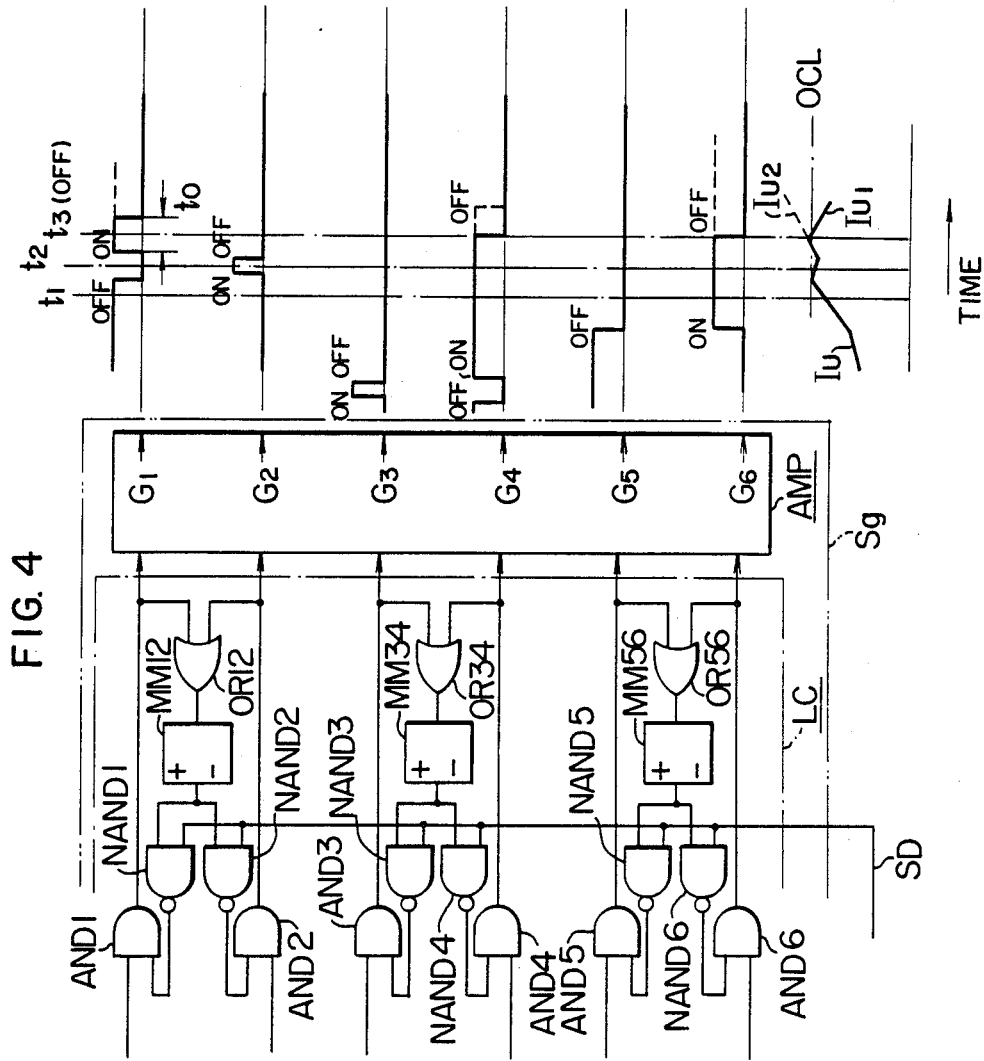
Figure 5:
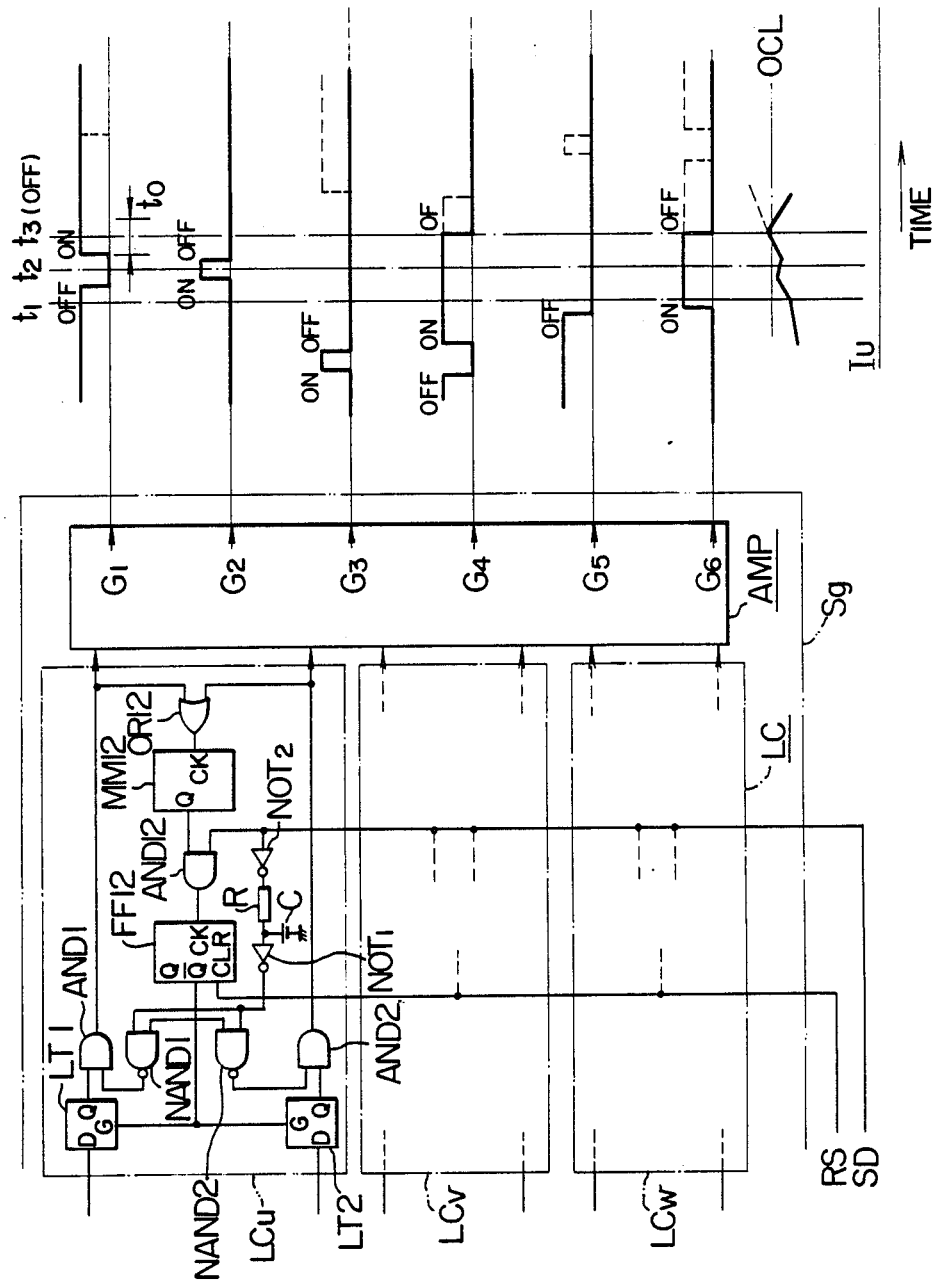
Figure 6:
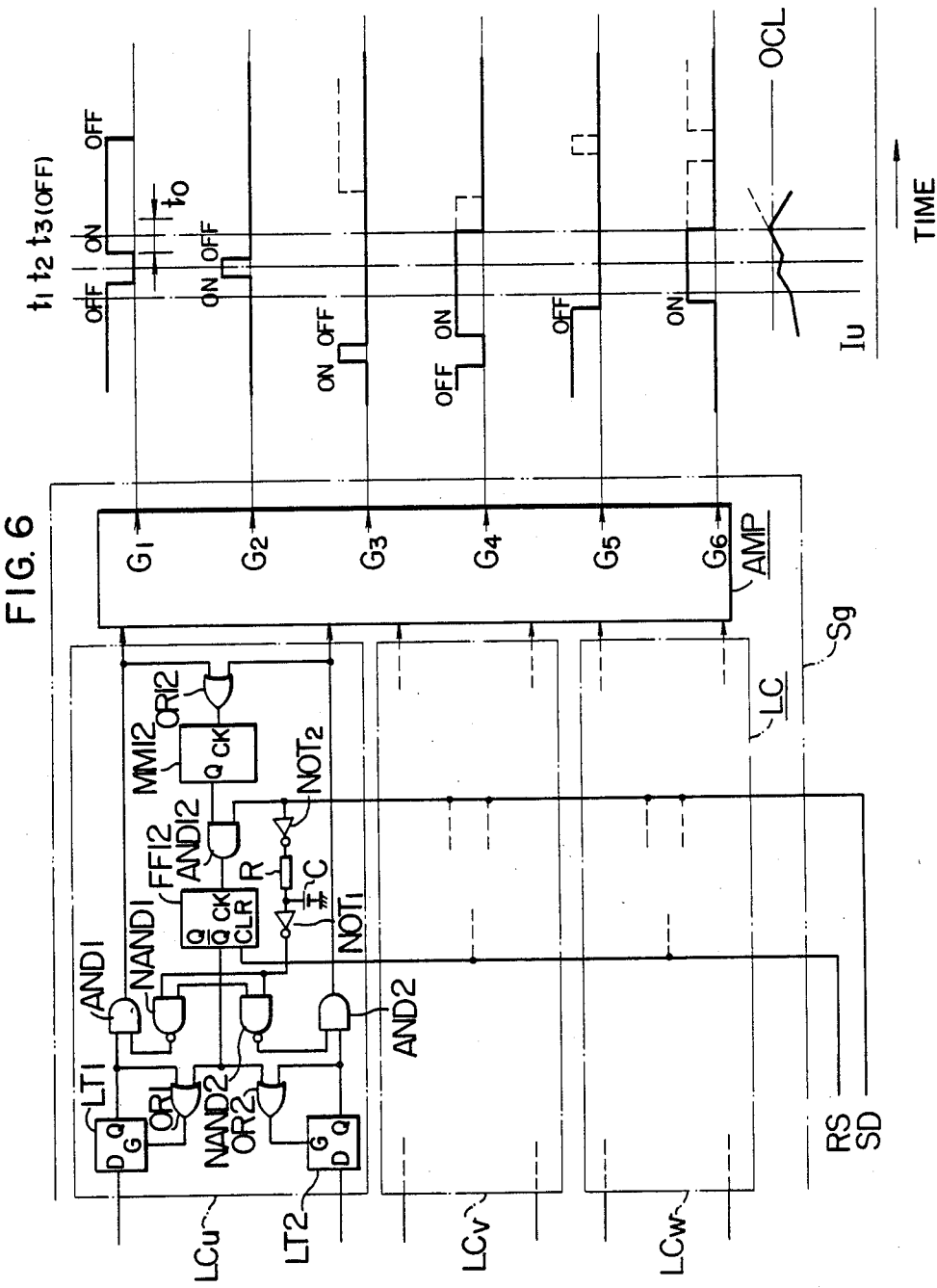
Figure 7:
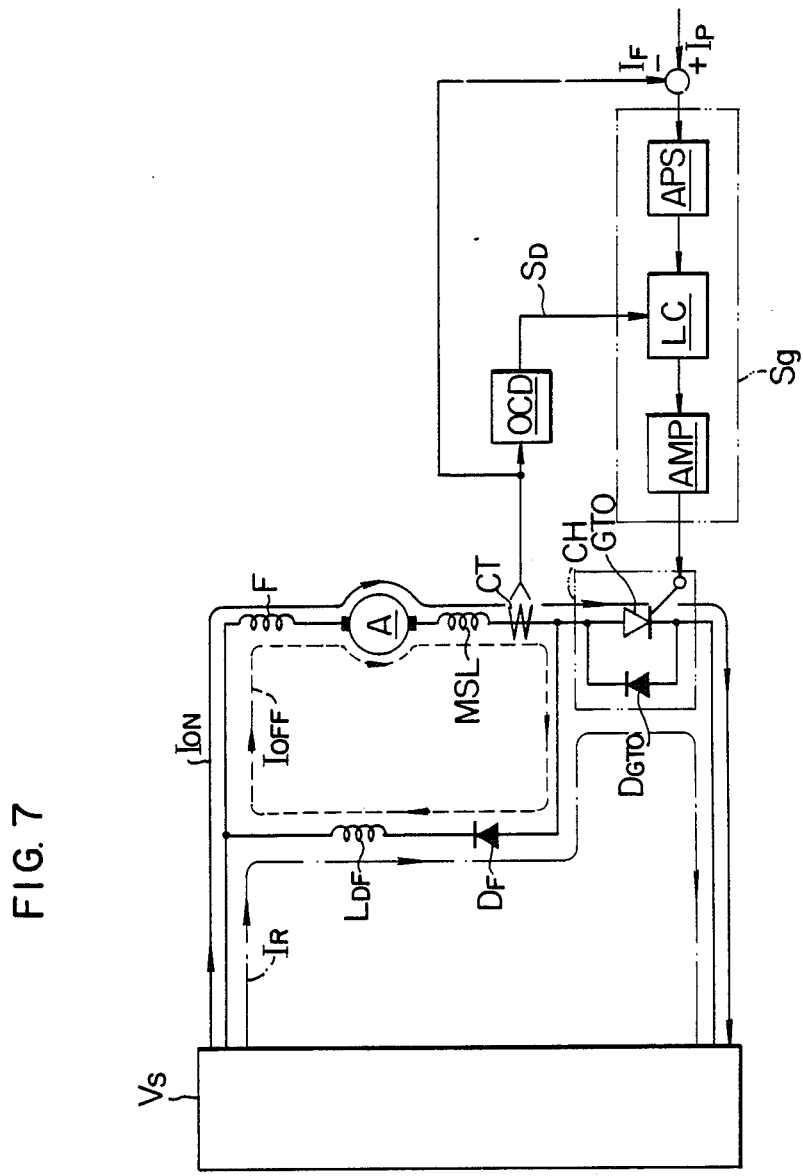

FIGS. 4 to 6 respectively show a control circuit and the operation at the time of protection from overcurrent in other embodiments;

FIG. 7 is a circuit diagram of a GTO chopper in still another embodiment of this invention; and FIGS. 8(A)-(D) are diagrams useful for explaining the operation thereof.

Figure 1:
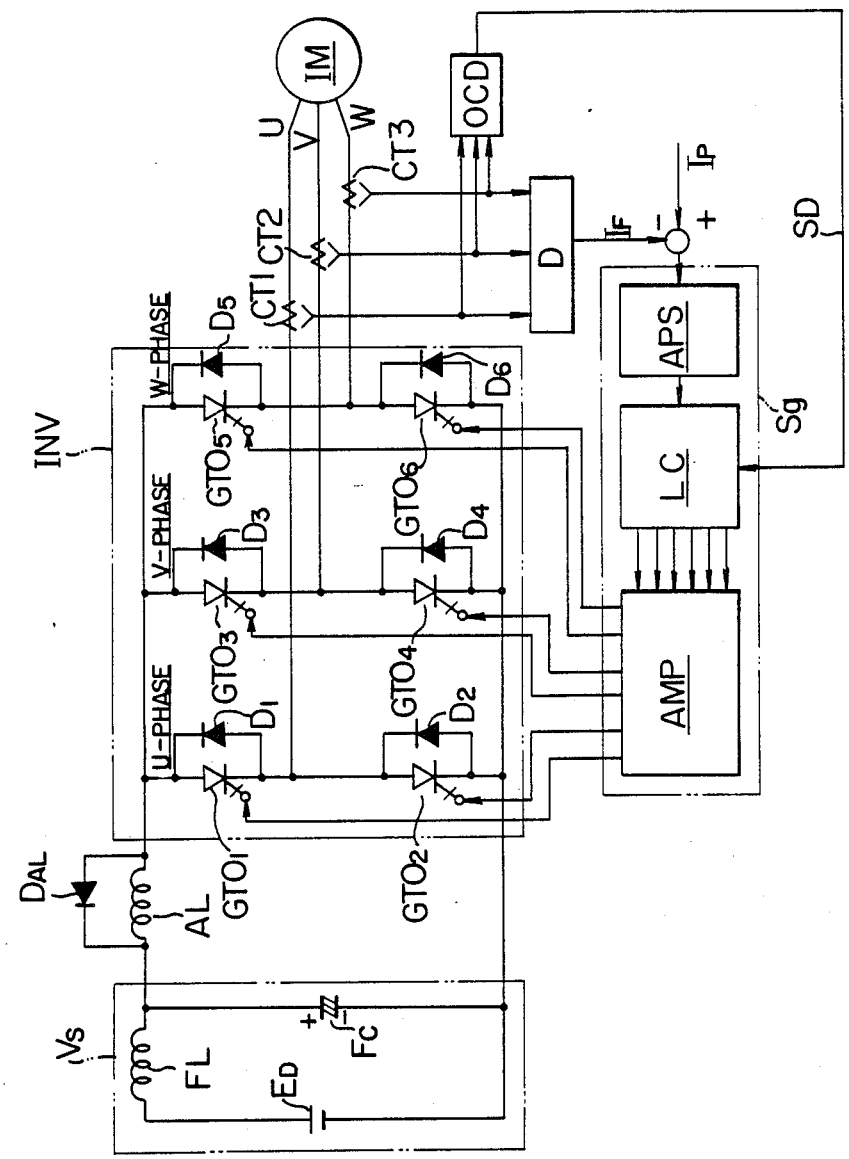
FIG. 1 is a circuit diagram of a GTO inverter according to one embodiment of this invention.

FIG. 1 shows an inverter circuit for driving an induction motor as one embodiment of this invention. The example of FIG. 1 employs gate turn-off thyristors GTO as self-turn-off semiconductor devices. The construction and operation of the GTO inverter circuit will be described briefly.

A power supply section VS is formed of a DC power supply ED, and a filter consisting of a filter reactor FL and a filter capacitor FC as shown in FIG. 1. This filter serves to smooth the intermittent current to be supplied on the basis of the on-off control operation of a GTO inverter circuit INV. The GTO inverter circuit INV as illustrated is formed of gate turn-off thyristors $GTO_1$ to $GTO_6$ across which free wheel diodes D1 to D6 are connected, respectively. An induction motor IM is connected to the junctions between the series-connected $GTO_1$ and $GTO_2$, $GTO_3$ and $GTO_4$, and $GTO_5$ and $GTO_6$, respectively. Between the power supply section VS and GTO inverter circuit INV is connected an anode reactor AL (across which a free wheel diode DAL is connected) for suppressing the overcurrent flowing when the power supply section is shorted by the GTO inverter circuit INV (for example, when the $GTO_1$ and $GTO_2$ are simultaneously made in the conducting state).

Figure 2:
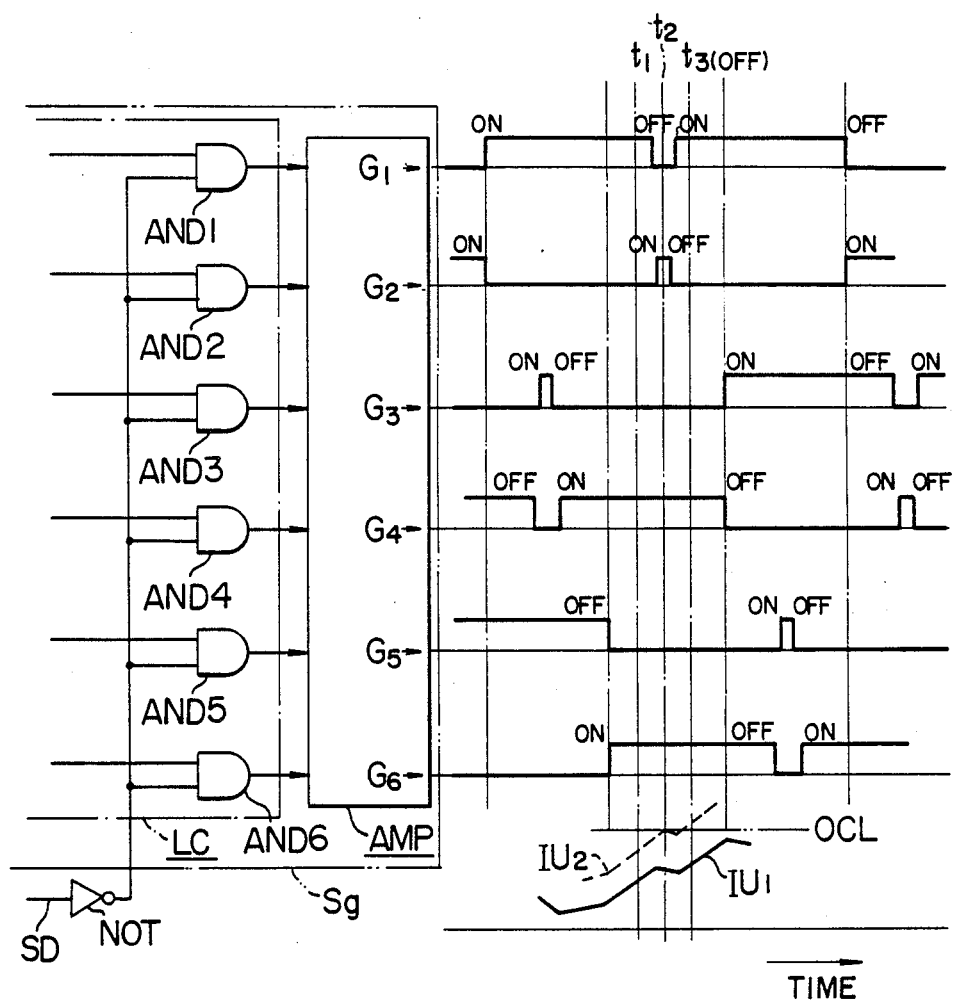
FIG. 2 shows a control circuit in this embodiment and the operation thereof.

A gate signal circuit Sg for the GTO inverter circuit INV is formed of a phase shifter APS, a logic circuit LC and a signal amplifying section AMP. The phase shifter APS operates to allow the actual induction motor current IF (current resulting from rectifying and smoothing the outputs of respective phase current detectors $CT_1$ to $CT_3$ by a three-phase fullwave rectifying circuit D) to be controlled to follow a current command IP. The GTO inverter circuit INV is on-off-controlled by the signals from the gate signal circuit Sg as shown in FIG. 2 (these signals are produced when the output, SD from an overcurrent detector OCD is "0" and hence the output of the NOT circuit is "1" and the overcurrent detector OCD compares the outputs of the respective phase current detectors $CT_1$ to $CT_3$ with a predetermined overcurrent level OCL). If, for example, the $GTO_1$, $GTO_4$ and $GTO_6$ are conductive at time $t_1$, currents IU, IV and IW flow in the induction motor IM as shown in the closed circuit,

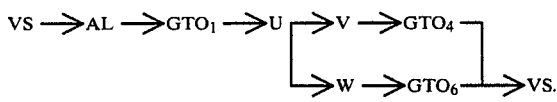

If the $GTO_1$ is nonconductive at time $t_2$, the currents flow in the motor as shown in the closed circuit,

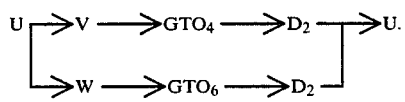

Figure 3:
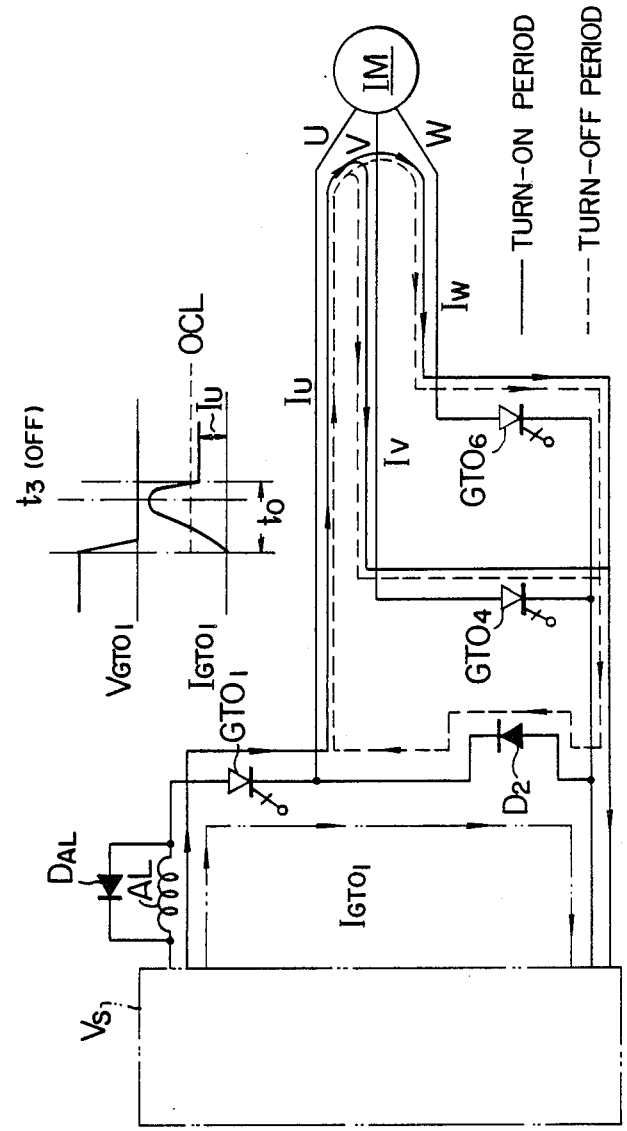
FIG. 3 is a diagram useful for explaining main circuit current paths and current waveform in this embodiment.

(the current in AL circulates through DAL) In this case, the GTO inverter circuit INV operates as shown in FIG. 3. In this way, the $GTO_1$ to $GTO_6$ are turned on and off by the signals from the gate signal circuit Sg, in a predetermined order, and with predetermined phase differences determined by the logic circuit LC. The induction motor IM is thus supplied with three-phase AC power of variable voltage and variable frequency.

If at time $t_1$ to $t_2$ shown in FIG. 2, the power voltage ED is suddenly increased by some cause, the current IU of U-phase in the induction motor, or $IU_1$ in the normal time is increased to reach the overcurrent level OCL as shown by dotted line $IU_2$. Consequently, the overcurrent detector OCD produces "1", and thus the NOT circuit output is "0", or the outputs of the AND circuits $AND_1$ to $AND_6$ are zero. Then, at time $t_3$, the $GTO_1$, $GTO_4$ and $GTO_6$ are supplied with off-pulse. Thus, the conductive $GTO_1$, $GTO_4$ and $GTO_6$ are turned off and the nonconductive GTO's are still in the off-state.

According to the embodiment shown in FIGS. 1 and 2, it is possible to detect the overcurrent in the load and cut off the overcurrent in a very short time (for example, several tens of $\mu$ sec) as compared with the cut-off time in the high-speed breaker (for example, several tens of m sec). Therefore, the GTO's, load and power supply can be protected from the overcurrent.

In this embodiment, the $GTO_1$, immediately after turning on at time $t_2$, turns off at time $t_3$. In general, the GTO with a free wheel diode connected thereacross which turns on and off to control the inductive load has a large current flow for the free wheel diode to make recovery immediately after turning off. Thus, just after the GTO turns on, a turn-off signal is applied thereto to cut off the large current (about 1.5 to 2 times the overcurrent level) and consequently, the turn-off pulse current becomes short and may break the GTO element. The circuit operation and operation waveforms in this situation are shown in FIG. 3. That is, when the $GTO_1$ is turned on, current flows through the path of $V_S \rightarrow GTO_1 \rightarrow D_2 \rightarrow V_S$ as indicated by the two-dot chain line in FIG. 3, cancelling the load current flowing in the free wheel diode $D_2$ and further causing the diode $D_2$ to make recovery. Therefore, a large current as shown by the current waveform of $IGTO_1$ in FIG. 3 flows in the $GTO_1$ and at this time $t_3$, when a turn-off pulse is applied, the gate circuit capable of only cut-off of up to the normal overcurrent level supplies insufficient turn-off pulse current, which may result in breaking the GTO element.

Another embodiment of this invention in which the above defect is removed will be described with reference to FIG. 4. In FIG. 4, the output of each AND ($AND_1$ to $AND_6$) of logic LC in FIG. 4 is connected back to the input of the AND ($AND_1$ to $AND_6$) through an OR circuit (OR12, OR34, OR56)→a one-shot multivibrator circuit MM (MM12, MM34, MM56)→NAND circuit NAND (NAND1 to NAND6), and the output SD of the overcurrent detector OCD is applied directly to each NAND (NAND1 to NAND6) with the NOT circuit in FIG. 2 being omitted. In this embodiment, when the output of the AND (AND1 to AND6) changes from "0" to "1", the output of "1" is applied through the OR circuit (OR12, OR34, OR56) to the one-shot multivibrator MM (MM12, MM34, MM56), and the output of the one-shot multivibrator is kept at "0" for a certain time and then becomes "1". The NAND circuit, when the output of the overcurrent detector OCD is "0", produces output of "1" irrespective of the output of the one-shot multivibrator MM, and thus the GTO's are supplied with on-off pulses with predetermined different phases, and in a predetermined order. When the output of the overcurrent detector OCD becomes "1", the output of each NAND circuit is "0" as long as the output of the one-shot multivibrator MM is "1", and consequently an off pulse is applied to each GTO which has been in the on-state.

Therefore, when the output SD of the overcurrent detector OCD becomes "1" at time $t_3$ shown in FIG. 4 on the right hand side, the $GTO_4$ and $GTO_6$ kept in the on-state by the application of on-pulse are immediately supplied with off-pulse since the output of the one-shot multivibrator MM of the circuit supplying the on-pulse is already "1", thus turning off as illustrated to suppress the U-phase current from exceeding the overcurrent level. On the other hand, at $t_3$ the output of the one-shot multivibrator MM 12 of the circuit supplying an on-pulse to the $GTO_1$ just turned on is still "0" since a constant time $t_0$ (the time necessary for a large current just after turning off to reduce to the load current level) shown in FIG. 3 by the waveform of $IGTO_1$ is provided, and therefore the NAND1 produces output of "1", or on-pulse. After the constant time $t_0$, the output of the one-shot multivibrator MM12 changes from "0" to "1", and the output of the NAND1 becomes "0", thus on off-pulse is applied to the $GTO_1$ to turn it off. According to this embodiment, in the protection system for turning off the GTO by detecting the overcurrent, the GTO in which a large current is flowed just after it turns on can be supplied with an off-pulse after a constant time, thereby being protected from overcurrent and hence breaking down. Even if the $GTO_1$ is late in its turning off, the $GTO_4$ and $GTO_6$ are rapidly turned off, thus the current flowing from the power supply into the load is cut off at high speed.

Still another embodiment of this invention will be described with reference to FIG. 5.

In FIG. 5, a latch circuit LT (LT1 to LT2) is provided directly before each AND (AND1 to AND2) of the logic circuit LC of FIG. 4, and the positive logic output Q of the one-shot multivibrator MM12 inserted in the feedback circuit of each AND (AND1 to AND2) is connected through an AND12 and through a flip-flop FF12 to one input end of each NAND (NAND1 to NAND2), the output of which is fed back to each AND (AND1 to AND2).

The output SD of the overcurrent detector OCD is connected directly to the other input end of each AND (AND1 to AND2) and also it is connected to the other input end of each NAND (NAND1 to NAND2) through a delay circuit formed by NOT1, NOT2, resistor R and capacitor C for delaying by a short time having no influence on the protective operation.

In this embodiment, when the output of the AND1 or AND2 changes from "0" to "1", which is then applied through the OR12 to the one-shot multivibrator MM12, the one-shot multivibrator MM12 produces a pulse signal of "1" during a constant time. However, when the output SD of the overcurrent detector OCD is "0", the $AND_1$ or $AND_2$ is kept at "0" irrespective of the output of the one-shot multivibrator MM12. Therefore, the flip-flop FF12 is inoperative and the gate terminal G of the latch circuit LT1 or LT2 remains at "1", so that the signal supplied at the data terminal D is transmitted directly to the output Q.

Similarly, when the output SD of the overcurrent detector OCD is "0", the outputs of the NAND1 and NAND2 are kept at "1". Consequently, the gate signal to the $GTO_1$ and $GTO_2$ is transmitted through the latch circuit LT1 and LT2 and then AND1 and AND2 to the signal amplifying section AMP, which then supplies on-and off-pulses with predetermined different phases, and in a predetermined order to each $GTO_1$ or $GTO_2$.

When the output SD of the overcurrent detector OCD becomes "1", and the output of the one-shot multivibrator MM12 is "1", the output of the AND12 changes from "0" to "1" and thus the negative logic output $\overline{Q}$ of the flip-flop 12 is changed from "1" to "0". Therefore, the gate terminals G of the latch circuits LT1 and LT2 become at "0", and thus the outputs Q of the latch circuits LT1 and LT2 hold the information which has so far been inputted to the data terminal D.

On the other hand, the output signal SD = "1" of the overcurrent detector OCD is applied through the delay circuit formed of the NOT1, NOT2, resistor R and capacitor C, to the NAND's 1 and 2. However, since the output $\overline{Q}$ of the flip-flop 12 changes from "1" to "0" a moment therebefore, the outputs of the NAND's 1 and 2 remain unchanged, or "1".

When the output SD of the overcurrent detector OCD becomes "1" and the output of the one-shot multivibrator MM12 is "0", the flip-flop FF12 is inoperative with output $\overline{Q}$ maintained at "1". Then, when the output SD = "1" of the overcurrent detector OCD is applied through the delay circuit to one input terminals of the NAND's 1 and 2, the outputs of the NAND's 1 and 2 are changed from "1" to "0", and thus the output of the AND ($AND_1$ to $AND_2$) which has been at "1" is immediately made "0", supplying an off-pulse to the $GTO_1$ or $GTO_2$ which is conductive. The output of the $AND_1$ or 2 which has been "0" remains unchanged. While the construction and operation of the U-phase logic circuit LCu have been described above, those of the other V- and W-phase logic circuits are the same.

In the embodiment shown in FIG. 5, when the U-phase current IU, for example, is increased to exceed the overcurrent limit OCL at time $t_3$, the output SD of the overcurrent detector OCD becomes "1" and thus according to the above-mentioned operations, the $GTO_4$ and $GTO_6$ which have been operative are immediately turned off and the $GTO_2$, $GTO_3$ and $GTO_5$ which have been inoperative are kept in the off-state. When the SD of the overcurrent detector OCD becomes "1" within time $t_0$ in which the output of the one-shot multivibrator MM becomes "1", the state of the $GTO_1$ at that time is maintained by operation of the latch circuit LT.

The system reset signal, RS is a signal produced when the system is restarted, and this signal resets the flip-flops FF12, FF34 and FF56.

FIG. 6 shows a further embodiment.

In FIG. 6, the outputs of OR1 and OR2 are respectively connected to the gate terminals G of the latch circuits LT1 and LT2 of FIG. 5, one input terminals thereof are connected to the output $\overline{Q}$ of the flip-flop FF12 and the other input terminals thereof are connected to the outputs Q of the latch circuits LT1 and LT2, respectively.

Thus, when the output SD of the overcurrent detector OCD becomes "1", and even when the outputs Q and $\overline{Q}$ of the one-shot multivibrator MM12 become "1" and "0", respectively, the latch circuits LT1 and LT2 are inoperative as long as their own outputs Q are "1". However, when the outputs Q of the latch circuits LT1 and LT2 are changed from "1" to "0", the output of "0" is applied to the gate terminals G of the latch circuits LT1 and LT2 thereby actuating them to hold "0" at output Q.

On the other hand, when the output SD of the overcurrent detector OCD is "1" and the output Q of the one-shot multivibrator MM12 is "0", the same operations as in the embodiment of FIG. 5 are performed.

In this embodiment, when the output SD of the overcurrent detector OCD becomes "1" at time $t_3$ as in FIG. 5, the $GTO_2$ to $GTO_6$ are in the same states as in the embodiment of FIG. 5, that is, the $GTO_4$ and $GTO_6$ which have been in the on-state are immediately turned off and the $GTO_2$, $GTO_3$ and $GTO_5$ which have been in the off-state remain in the off-state. However, when the output SD of the overcurrent detector OCD becomes "1" within constant time $t_0$ in which the output Q of the one-shot multivibrator MM12 is "1", the output $\overline{Q}$ of the flip-flop FF12 changes from "1" to "0" and then the output Q of the latch circuit LT1 changes from "1" to "0", so that the $GTO_1$ is supplied with an off signal, thus turning off.

In other words, when the overcurrent detector OCD produces "1" within a constant time after the GTO is turned on, the GTO is kept in the on-state until normal off signal is applied thereto, and it is held in the off-state after the normal off-signal is applied thereto to turn off.

While the induction motor is controlled by the GTO inverter in this embodiment, this invention is not limited thereto, but can be applied to all the control of the inductive load by the self-turn-off semiconductor device with free wheel diode connected thereacross as, for example, the DC motor is controlled by the GTO chopper.

An embodiment of this invention using a GTO chopper will hereinafter be described with reference to FIGS. 7 and 8.

The power supply section VS is formed of a DC power supply and a filter of a reactor and capacitor as described previously. A chopper circuit CH is formed of a gate turn-off thyristor GTO and a diode DGTO connected across the thyristor GTO in the opposite direction.

Between the power supply section VS and the chopper circuit CH are connected the armature winding A of the DC series motor as an inductive load, a field winding F and a smoothing reactor MSL for reducing current ripple.

On the other hand, a series circuit of a free wheel diode DF and a reactor LDF for suppressing the recovery current for the free wheel diode DF has its one end connected to the + side end of the power supply section VS and its other end connected to the anode of the gate turn-off thyristor GTO as shown in FIG. 7.

Figure 8:
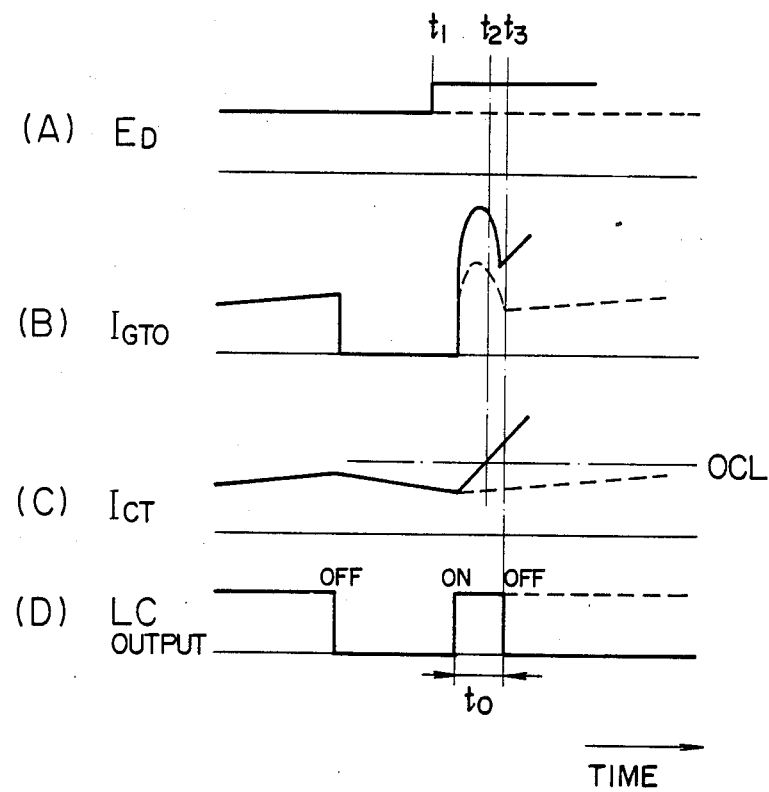

In FIGS. 7 and 8, the gate signal circuit Sg and the overcurrent detector OCD designate one arm of the inverter in the above embodiment.

In this embodiment, when the GTO is turned on, the current ION flows through the path of VS→F→A→MSL→GTO→VS as indicated by the solid line, and when the GTO is turned off, the current IOFF flows through the path of A→MSL→DF→LDF→F→A as indicated by the broken line. In addition, at the instant the GTO is turned on, the current IR for recovery of the free wheel diode DF flows through the path of VS→LDF→DF→GTO→VS as indicated by one-dot chain line, in superposition on the current ION flowing when it is on.

The supply voltage ED, GTO current IGTO, detected current ICT from the current detector CT and output of logic circuit LC at this time are as shown in FIG. 8 at (A), (B), (C) and (D) by broken lines.

Referring to FIG. 8, when the supply voltage ED is suddenly changed by some cause immediately before the GTO is turned on, and then when the GTO is turned on, the IGTO of large value flows as shown at (B) by solid line. Also, the detected current from the current detector is suddenly changed to reach the overcurrent level OCL at time $t_2$. Therefore, the overcurrent detector OCD operates to tend to make the GTO in the off-state, but since the GTO current IGTO at time $t_2$ is great as described above, the GTO might be broken down if it were turned off at this time. Thus, as described in the embodiment of the inverter, part of the logic circuit LC is formed as one arm of a circuit as shown in FIG. 4, thereby enabling the GTO to be turned off safely after the lapse of the large current period $t_0$.

We claim:

1. A control system for a power converter comprising a power supply, an inductive load, a power converter having a plurality of self-turn-off-type semiconductor means for being turned on and off by a gate signal applied thereto and being connected between said power supply and said inductive load, free wheel circuit means for forming circuits in which currents flowing through said inductive load do not circulate through said power supply, and means for generating gate signals by which said plural self-turn-off-type semiconductor means are controlled to turn on and off in a predetermined order, said control system further including detecting means for detecting that the current flowing through said inductive load exceeds a predetermined value, and means for supplying off-gate signals to said self-turn-off-type semiconductor means which have been in the on-state for at least a predetermined time after being applied with the on-gate signals, in response to the output of said detecting means.

2. A control system for a power converter according to claim 1, wherein said off-gate signal supplying means includes timing means for supplying the off-gate signals to the self-turn-off-type semiconductor means which have been conductive for less than said predetermined time after the application of said on-gate signals thereto, after a lapse of said predetermined time.

3. A control system for a power converter according to claim 1, wherein said off-gate signal supplying means includes timing means for supplying normal off-gate signals generated from said gate signal generating means to the self-turn-off-type semiconductor means which has been conductive for less than said predetermined time after being applied with said on-gate signal, after the lapse of said predetermined time.

4. A control sytem for a power converter comprising a DC power supply, an induction motor, an inverter having a plurality of gate-turn-off thyristors and being connected between said DC power supply and said induction motor, free wheel diodes which form circuits in which the current flowing through said induction motor does not circulate through said DC power supply, and means for generating gate signals by which said gate-turn-off thyristors are controlled to turn on and off in a predetermined order, said control system further including detecting means for detecting that the current flowing through said induction motor exceeds a predetermined value, and means for supplying off-gate signals to said gate-turn-off thyristors which have been conductive for at least a predetermined time after being applied with on-signals, in response to the output of said detecting means.

5. A control system for a power converter according to claim 1, wherein said plurality of self-turn-off type semiconductor means comprise one of gate-turn-off thyristors and static inductive thyristors.

6. A control system for a power converter according to claim 1, wherein said free wheel circuit means includes a respective one of said self-turn-off-type semiconductor means and a diode connected in parallel therewith.

7. A control system for a power converter according to claim 4, wherein a respective one said free wheel diodes is connected in parallel with a respective one of said gate-turn-off thyristors.

8. A control system for a power converter according to claim 4, wherein said off-gate signal supplying means includes timing means for supplying the off-gate signals to the gate-turn-off thyristors which have been conductive for less than said predetermined time after the application of said on-gate signals thereto, after the lapse of said predetermined time.

* * * * *